US012727700B2

(12) United States Patent
Tokoro et al.

(10) Patent No.: US 12,727,700 B2
(45) Date of Patent: Sep. 8, 2026

(54) COOKING DEVICE WITH ENHANCED THERMAL CONDUCTIVITY

(71) Applicant: TAMURAKOKI CO., LTD., Tochigi (JP)

(72) Inventors: Tomohiro Tokoro, Tochigi (JP); Jin Sugiyama, Tochigi (JP); Sakurako Ishida, Tochigi (JP); Miwa Tokoro, Tochigi (JP); Keiko Kobana, Tochigi (JP)

(73) Assignee: TAMURAKOKI CO., LTD., Tochigi (JP)

( * ) Notice: Subject to any disclaimer, the term of this patent is extended or adjusted under 35 U.S.C. 154(b) by 0 days.

(21) Appl. No.: 19/108,855

(22) PCT Filed: May 11, 2023

(86) PCT No.: PCT/JP2023/017724
§ 371 (c)(1),
(2) Date: Mar. 5, 2025

(87) PCT Pub. No.: WO2024/053161
PCT Pub. Date: Mar. 14, 2024

(65) Prior Publication Data

US 2026/0000233 A1 Jan. 1, 2026

(30) Foreign Application Priority Data

Sep. 6, 2022 (JP) ................................ 2022-141729

(51) Int. Cl.
*A47J 27/022* (2006.01)
*A47J 36/02* (2006.01)

(52) U.S. Cl.
CPC ............ *A47J 27/022* (2013.01); *A47J 36/02* (2013.01)

(58) Field of Classification Search
CPC .......... A47J 27/022; A47J 36/02; A47J 27/02; A47J 36/26; Y10S 220/912; Y02B 40/00
(Continued)

(56) References Cited

U.S. PATENT DOCUMENTS

| | | | | |
|---|---|---|---|---|
| 1,578,741 A | | 3/1926 | Lack et al. | |
| 2,014,931 A | * | 9/1935 | Genovar, Jr. | A47J 37/10 126/390.1 |

(Continued)

FOREIGN PATENT DOCUMENTS

| | | |
|---|---|---|
| CH | 181498 A | 12/1935 |
| CN | 201189082 Y | 2/2009 |

(Continued)

OTHER PUBLICATIONS

International Search Report (ISR) dated Jun. 20, 2023 filed in PCT/JP2023/017724.

(Continued)

*Primary Examiner* — Nathan J Jenness
*Assistant Examiner* — John Martin Hoppmann
(74) *Attorney, Agent, or Firm* — RANKIN, HILL & CLARK LLP

(57) ABSTRACT

The present invention relates to a cooking device such as a pot, and an object thereof is to provide a cooking device that is lightweight and has high strength and capable of boiling hot water in a short time by providing a cooking device that efficiently transfers heat from a heat source to an object to be cooked. The present invention is a cooking device having a configuration in which a side wall portion of a container has an air inflow/outflow adjustment portion circumferentially provided with an air inflow/outflow port protruding downward from a bottom surface portion, and a plurality of heat transfer protrusions protruding outward from the bottom surface portion are provided on the bottom surface
(Continued)

portion of the container. The arrangement of the heat transfer protrusions is arranged linearly toward the center of the bottom surface portion at a predetermined interval, or arranged so as to draw an arc toward the center. The cooking device includes a heat transfer step including a plurality of steps protruding toward the inside of the bottom surface portion, a heat transfer side surface vertical step including a plurality of steps in the vertical direction on the side wall portion of the container, or a heat transfer side surface horizontal step including a plurality of steps in the horizontal direction on the side wall portion of the container.

14 Claims, 7 Drawing Sheets

(58) Field of Classification Search
USPC .......... 220/573.1, 608, 912, 673; 126/390.1; 99/447, 450
See application file for complete search history.

(56) References Cited

U.S. PATENT DOCUMENTS

| | | | | |
|---|---|---|---|---|
| D669,730 | S * | 10/2012 | Mandil | D7/354 |
| 2004/0011350 | A1 | 1/2004 | Dowst et al. | |
| 2010/0206884 | A1 | 8/2010 | Tunstall | |
| 2010/0282457 | A1 * | 11/2010 | Li | A47J 27/022 165/185 |
| 2015/0144680 | A1 | 5/2015 | Kao | |
| 2016/0007791 | A1 * | 1/2016 | Schoofs | A47J 36/02 126/390.1 |

FOREIGN PATENT DOCUMENTS

| | | | | |
|---|---|---|---|---|
| CN | 204133151 | U | 2/2015 | |
| CN | 104545433 | A | 4/2015 | |
| CN | 216454557 | U * | 5/2022 | A47J 27/022 |
| DE | 818558 | C | 10/1951 | |
| EP | 2974629 | A1 | 1/2016 | |
| FR | 538263 | A | 6/1922 | |
| JP | S50121093 | U | 10/1975 | |
| JP | S5168261 | U | 5/1976 | |
| JP | S5297257 | U | 7/1977 | |
| JP | S5371056 | U | 6/1978 | |
| JP | H021030 | U | 1/1990 | |
| JP | 2003265329 | A | 9/2003 | |
| JP | 3146405 | U | 11/2008 | |
| JP | 2009106780 | A | 5/2009 | |
| JP | 2015132430 | A | 7/2015 | |

OTHER PUBLICATIONS

Japanese Office Action (JPOA1) dated Nov. 1, 2022 for Japanese Patent Application No. 2022-141729; English machine translation.
Japanese Office Action (JPOA2) dated Feb. 28, 2023 for Japanese Patent Application No. 2022-141729; English machine translation.
Australian Office Action issued on Feb. 26, 2026 and issued for Australian Patent Application No. 2023337707.
"Have You Heard of the Sacred UL Cooker "L.T. Cooker"? Save Fuel with a Jet-Style Stove!" Author / Uploader: Hiking and BikePacking, Publication Type: Online video (YouTube), Publication Date: Sep. 5, 2022, URL: https://www.youtube.com/watch?v=0CiFTSM5m3A; Cited in Australian Office Action.

* cited by examiner (a)
1·30
32
31
(b)
1·30
31
40
41
(c)
1·30
50
50
50
31
32
(d)
20
1·30
31
32
50
40
10
31
40
50

COOKING DEVICE WITH ENHANCED THERMAL CONDUCTIVITY

TECHNICAL FIELD

The present invention relates to a technique of a cooking device that is lightweight and has enhanced thermal conductivity, particularly suitable for cooking in outdoors or the like, and more particularly to a technique of a cooking device that increases a surface area by providing a large number of irregularities on an outside of a bottom surface portion of the cooking device such as a pot and efficiently transmits heat from a heat source to an object to be cooked.

BACKGROUND ART

Due to the influence of the coronavirus infection in recent years, a tour trip, a large number of eating-out activities, and the like are refrained. On the other hand, there is a quiet boom in enjoying outdoor food on a personal and home scale. In particular, in the case of mountain climbing by camping alone or traveling alone by motorcycle touring, it is necessary to push many luggage into a backpack or the like for one person. Therefore, a light and sturdy cooking device or the like is required. Therefore, it is conceivable to use an aluminum material as a lightweight pot or the like. This is because aluminum has a specific gravity of about ⅓ of iron, and has high specific strength and excellent thermal conductivity. These aluminum pots and the like are generally formed by deep drawing. However, deep drawing processing has a problem that a fine shape cannot be formed. In addition, there is also a method of obtaining a fine shape by forging using a press or the like, but there is a problem that the cost increases because a die becomes expensive, and aluminum cannot be made thin by forging so that the characteristic of lightness of aluminum cannot be utilized.

There are a wide variety of heat sources, and examples thereof include solid fuels obtained by solidifying organic substances such as firewood, charcoal, and alcohol, liquid fuels such as benzine and alcohol, and gas cylinders such as propane. In any case where the heat source is used, it is desired to reduce the consumption of the fuel and the like as much as possible.

In this regard, a heat source device such as a stove or a burner has been developed, and a gas fuel in which isobutane is contained in propane filled in a gas cylinder to improve thermal power, ignitability, or combustion stability has been developed. However, it is considered that there is still a problem to be solved in a cooking device such as a pot. That is, it is necessary to develop not only a heat source or fuel that gives heat but also a technique of a cooking device that receives and transmits heat, and the appearance of a cooking device that can cook with less fuel and in a shorter time is awaited.

Therefore, in view of these problems, the inventor or inventors of the present application have focused on the thermal conduction characteristics, specific gravity, specific strength, and the like of the material, and has completed the present invention through trial and error based on an idea that a time until water is boiled can be shortened while solving the above problems by increasing a surface area in contact with heat by cutting a shape of a pan bottom or the like into irregularities that easily absorb heat from the heat source.

In addition to the inventors of the present application, various technical proposals have been made heretofore. For example, a technique in which the name of the invention is "Chinese pot" is disclosed (see Patent Literature 1). Specifically, it is an object to "Provided is a Chinese pot capable of cooking ingredients more quickly at a higher temperature than conventional ones, saving energy, and smoothly performing a barb operation for uniformly heating the ingredients.", and as a solution, "A pair of opposite hole-present regions where a large number of holes penetrating a pot body are formed and a pair of opposite hole-free regions where the holes are not formed are provided around a hole-free pot bottom central region in the pot body, and a handle is provided on an outer surface portion of the pot body corresponding to the hole-free region.". However, the invention disclosed in Patent Literature 1 is common with the technology of the present invention in that the ingredients is cooked more quickly at a higher temperature to save energy, but is different in that measures for forming a hole in the pot body and directly taking hot air as a heat source into the pot body is used, and cooking in a room such as a Chinese pot is assumed, and the portability such as lightness and compactness of the main body is not provided.

In addition, a technique in which the name of the invention is "heating cooking tool" is disclosed (see Patent Literature 2). Specifically, its object is to "It is possible to obtain a food such as a fried food having a crispy texture without being sticky, and it is easy to take out the food from the inside of the heating cooking device.", and the solution is to "Provided are a bottom portion of an uneven structure in which a rib-shaped convex portion capable of coming into contact with a food and a groove-shaped concave portion adjacent to the convex portion capable of temporarily storing an oil component or the like flowing out from the heated food are repeatedly formed, a pair of wall portions formed on a further outside in a direction in which the repeatedly formed convex portions and concave portions are adjacent, and inclined portions formed on both ends of the concave portion in the groove direction so as to be inclined upward.". However, the technique disclosed in Patent Literature 2 has a common portion in terms of shape, such as a rib shape of a portion that can come into contact with food and a bottom portion of an uneven structure, but is different in that it is intended to temporarily store oil and moisture flowing out of food.

In addition, a technique in which the title of the invention is "combined type magnetically conductive pot" is disclosed (see Patent Literature 3).

Specifically, its object is "Provided is a magnetically conductive pot in which a pot bottom is less deformed, and a magnetically conductive plate is more tightly bound to a bottom of a pot body", and the solution is "There are provided a pot body and a magnetically conductive plate at the bottom of the pot with the following features. That is, the pot bottom has a preformed circular base and a circular groove concentric with the circular base, and the magnetically conductive plate that meets the circular base has a flange preformed. An aluminum plate in which the circular groove and a recess that meets the flange are preformed is designed by a punch processing method so that the magnetically conductive plate fits into the circular groove and the flange penetrates the aluminum plate to be integrated. The flange preformed on the magnetically conductive plate and the recess of the aluminum plate fit each other, and when punched, the flange penetrates the aluminum plate to be integrated with the flange, and a side wall of the aluminum plate is tightly fitted with the circular groove. The magnetically conductive plate and the pot bottom are more tightly connected to each other, and the magnetic conduction effect is also excellent". However, the technique disclosed in Patent Literature 3 has a common part in the shape of the flange preformed on the magnetic conductive plate at the pot bottom, but improves the magnetic conduction effect, and has a different object from the present invention used in direct flame or the like.

CITATION LIST

Patent Literature

Patent Literature 1: JP-A-2003-265329
Patent Literature 2: JP-A-2015-132430
Patent Literature 3: Utility Model Registration No. 3146405

SUMMARY OF INVENTION

Problems to be Solved by Invention

An object of the present invention is to provide a cooking device that is lightweight and has high strength and capable of boiling hot water in a short time by using a cooking device provided with a large number of irregularities at a bottom of a pot to efficiently transfer heat from a heat source to an object to be cooked.

Solution to Problems

The present invention is directed to a cooking device capable of efficiently transferring heat obtained from a heat source to an object to be cooked and including a substantially pot shaped container, and the cooking device has a configuration in which a side wall portion of the container has an air inflow/outflow adjustment portion circumferentially provided with an air inflow/outflow port protruding downward from a bottom surface portion, and a plurality of heat transfer protrusions protruding outward from the bottom surface portion are provided on the bottom surface portion of the container.

In addition, the present invention may adopt a configuration in which a plurality of rows of the heat transfer protrusions linearly arranged toward a center of the bottom surface portion at predetermined intervals are provided in a circumferential direction.

In addition, the present invention may also adopt a configuration in which a plurality of rows of the heat transfer protrusions arranged so as to draw an arc toward a center at predetermined intervals are provided in a circumferential direction.

In addition, the present invention may also adopt a configuration including a heat transfer step including a plurality of steps protruding toward an inside of the bottom surface portion of the container.

In addition, the present invention may also adopt a configuration in which the side wall portion of the container includes a heat transfer side surface vertical step including a plurality of steps in a vertical direction.

In addition, the present invention may also adopt a configuration in which the side wall portion of the container includes a heat transfer side surface horizontal step including a plurality of steps in a horizontal direction.

Effects of Invention

According to the cooking device with enhanced thermal conductivity according to the present invention, since a large number of irregularities are provided at the bottom of the cooking device to increase the surface area in contact with heat from the heat source, excellent effects such that heat can be efficiently transmitted to the object to be cooked, hot water can be boiled in a short time, and the like, and wasteful energy consumption can be suppressed are exhibited.

In addition, in a case where the configuration in which the heat transfer protrusions according to the present invention are arranged so as to draw an arc toward the center at predetermined intervals is adopted, compared to the arrangement in which the heat transfer protrusions are arranged linearly from the heat source toward the outside of the bottom surface portion, the flow of heat from the heat source comes into contact with the outside of the bottom surface portion along the arc for a long time, so that an excellent effect such that heat can be more efficiently transmitted to the object to be cooked is exhibited.

In addition, according to the cooking device with enhanced thermal conductivity according to the present invention, the heat transfer protrusions serve as ribs (reinforcing members), and a cooking device having high strength can be provided. Further, aluminum or titanium is selected as a material having a small specific gravity and excellent cutting performance, so that an excellent effect such that a cooking device that is lightweight and high in productivity can be provided is exhibited.

In the cooking device with enhanced thermal conductivity according to the present invention, in a case where the configuration including the heat transfer step including the plurality of steps protruding toward the inside of the bottom surface portion of the container is adopted, the surface area where the bottom surface portion and the object to be cooked are in contact with each other increases, so that an excellent effect such that heat can be more efficiently transferred to the object to be cooked is exhibited.

In the cooking device with enhanced thermal conductivity according to the present invention, in a case where the configuration in which the side wall portion of the container includes the heat transfer side surface step including a plurality of steps in the vertical direction or the horizontal direction is adopted, not only heat can be efficiently transmitted to the object to be cooked, but also an excellent effect such that a cooking device having high designability can be provided is exhibited.

BRIEF DESCRIPTION OF DRAWINGS

FIGS. 4(*a*) to 4(*c*) are example illustrative diagrams illustrating an example in which the heat transfer protrusions are arranged so as to draw an arc toward a center at predetermined intervals according to the present invention.

DESCRIPTION OF EMBODIMENTS

Figure 1:
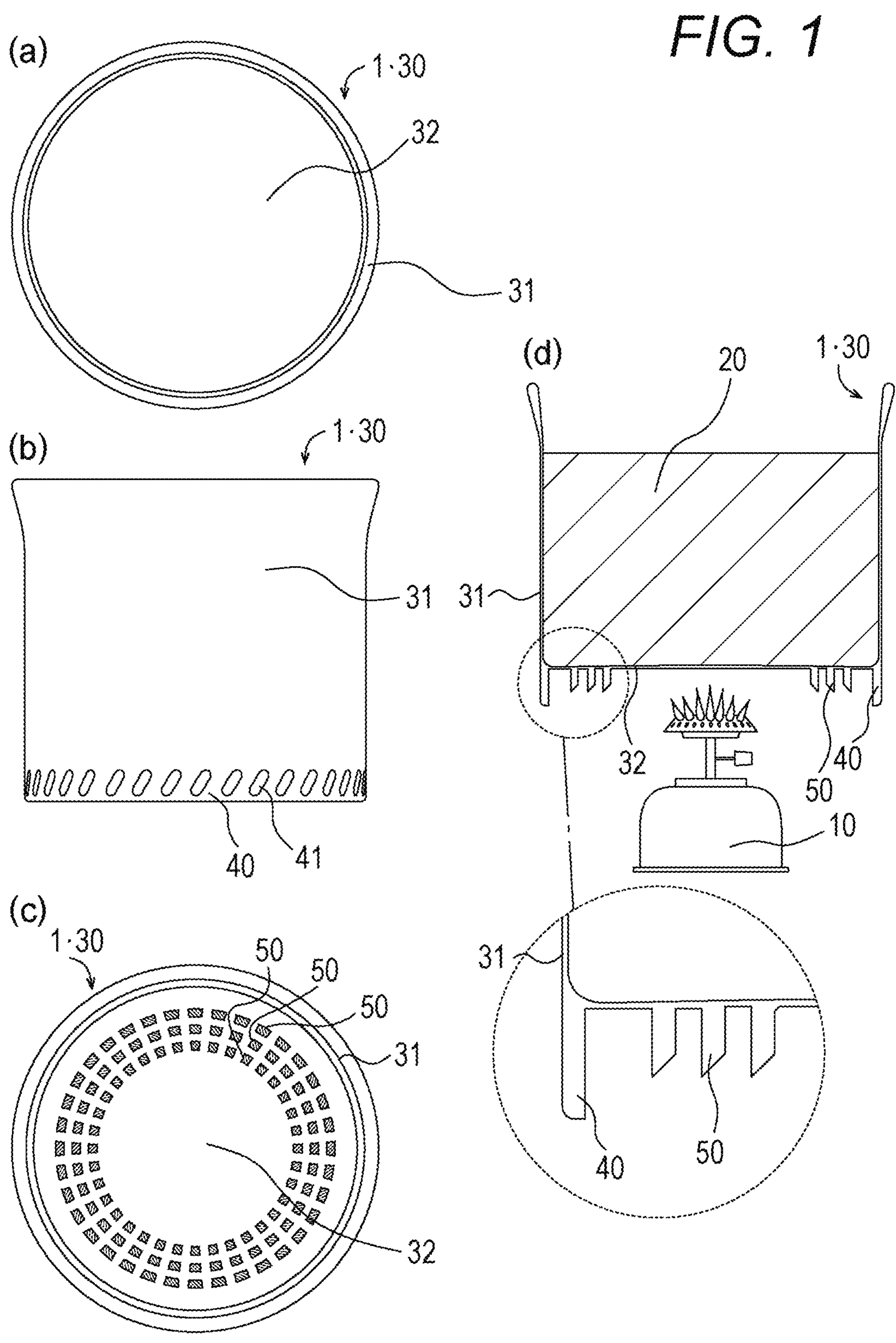
FIGS. 1(*a*) to 1(*d*) are basic configuration illustrative diagrams illustrating a basic configuration of a cooking device with enhanced thermal conductivity according to the present invention.

The maximum feature of the present invention is to provide a cooking device capable of efficiently transferring heat obtained from a heat source to an object to be cooked and including a substantially pot shaped container, the cooking device having a configuration in which a side wall portion of the container has an air inflow/outflow adjustment portion circumferentially provided with an air inflow/outflow port protruding downward from a bottom surface portion, and a plurality of heat transfer protrusions 50 protruding outward from the bottom surface portion are provided on the bottom surface portion of the container. Hereinafter, a description will be given with reference to the drawings. However, the present invention is not limited to the shape and configuration described in the drawings, and can be modified within the scope of obtaining the effect exhibited as the creation of the technical idea of the present invention.

FIGS. 1(*a*) to 1(*d*) are basic configuration illustrative diagrams illustrating a basic configuration of a cooking device 1 with enhanced thermal conductivity according to the present invention, in which FIG. 1(*a*) is a plan view, FIG. 1(*b*) is a front view, FIG. 1(*c*) is a bottom view, and FIG. 1(*d*) is a cross-sectional view and an enlarged view of heat transfer protrusion portions. Each configuration will be described below.

The cooking device 1 is a cooking device capable of efficiently transferring heat obtained from a heat source 10 to an object to be cooked 20 and including a substantially pot shaped container 30, in which a side wall portion 31 of the container 30 has air inflow/outflow adjustment portion 40 circumferentially provided with a plurality of air intake ports 41 protruding downward from a bottom surface portion 32, and a plurality of heat transfer protrusions protruding outward from the bottom surface portion 32 are provided on the bottom surface portion 32 of the container 30.

The heat source 10 is not particularly limited, and may be, for example, a liquid fuel such as alcohol or benzine, a liquefied gas fuel such as propane, charcoal, firewood, coal briquettes, or a solid fuel obtained by solidifying an organic substance such as alcohol, which is burned, or electric heating such as an electric heater.

The object to be cooked 20 is mainly water, but is not particularly limited as long as the object to be cooked is an object to be cooked containing moisture or oil such as soup, miso-soup, stew, or simmering.

The container 30 is a container for storing liquid or the like having the side wall portion 31 and the bottom surface portion 32 and having an open upper portion.

The side wall portion 31 is a portion forming a side wall in the container 30. Although not illustrated in the drawings, a configuration in which a handle is provided on the side wall portion 31 is also preferable.

The bottom surface portion 32 is a portion configuring a bottom of the container 30, and corresponds to a so-called pan bottom or the like. In addition, in the portion, heat transfer protrusions 50 which are a technical feature of the present invention are provided.

Figure 4:
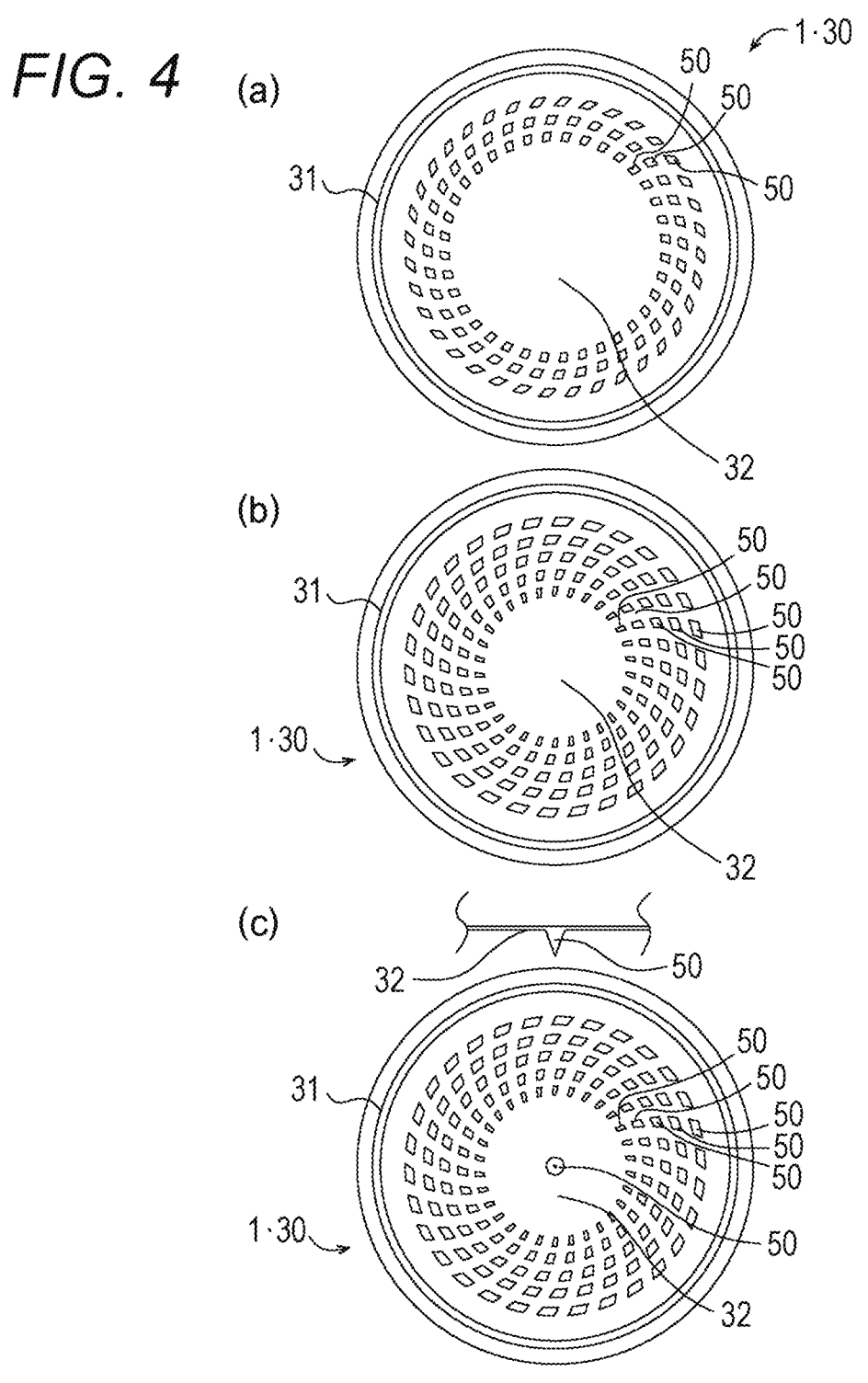

The heat transfer protrusions 50 are protrusions provided on the outside of the bottom surface portion 32 in order to enhance the heat transfer efficiency of the bottom surface portion 32 that transfers heat from the heat source 10 to the object to be cooked 20, and increase a surface area of the bottom surface portion 32 to enhance a heat transfer effect. The arrangement configuration of the heat transfer protrusions 50 may be an arrangement configuration in which a plurality of rows linearly arranged toward the center of the bottom surface portion 32 is provided in a circumferential direction as illustrated in FIGS. 1(*a*) to 1(*d*) and 2(*a*) and 2(*b*), or an arrangement configuration in which a plurality of rows in which the heat transfer protrusions 50 are arranged so as to draw an arc toward the center at a predetermined interval is provided in the circumferential direction as illustrated in FIG. 4. In the case of the linear arrangement, processing is easy, and in the case of the arc-shaped arrangement, a distance from the center of the bottom surface portion to the wall surface portion becomes long, and a flow of heat becomes long accordingly, which makes it possible to receive a large amount of heat from the heat source. In addition, in the case of an array drawing an arc, since the heat transfer protrusions 50 located on the front periphery are arranged at positions that do not obstruct the heat transfer protrusions 50 located on the next outside, the entire bottom surface portion can be overheated. As illustrated in FIG. 1(*d*), each of the plurality of heat transfer protrusions 50 is formed with a one-side inclined surface extending from inside to outside so that a distal end shape of the heat transfer protrusion 50 is substantially a wedge shape.

Figure 2:
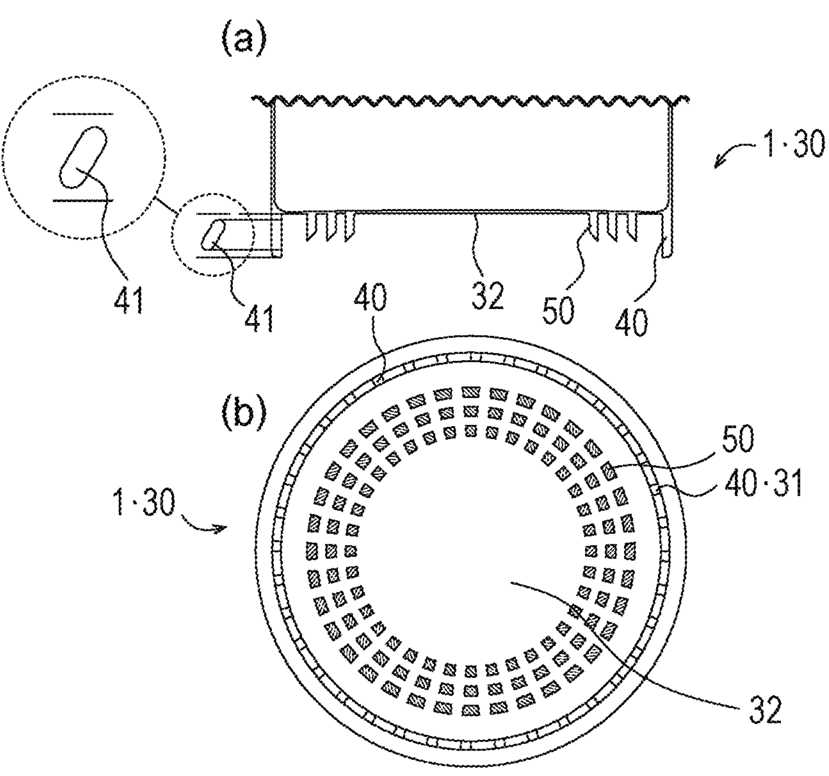
FIGS. 2(*a*) and 2(*b*) are configuration illustrative diagrams describing a configuration of an air inflow/outflow adjustment portion according to the present invention.

FIGS. 2(*a*) and 2(*b*) are configuration illustrative diagrams illustrating the configuration of an air inflow/outflow adjustment portion 40 according to the present invention, FIG. 2(*a*) is a cross-sectional view and an enlarged view of the air inflow/outflow port 41, and FIG. 2(*b*) is a bottom view.

The air inflow/outflow port 41 is a portion that serves as an intake port for taking in air required for combustion in a case where the heat source 10 is formed by combustion, and may serve as an exhaust port for incomplete combustion depending on fuel.

As shown in FIGS. 1(*a*) to 1(*d*) and an enlarged diagram of FIG. 1(*b*), the air inflow/outflow adjustment portion 40 is a portion in which the side wall portion 31 of the container 30 protrudes downward from the bottom surface portion 32, and the air inflow/outflow adjustment portion 40 is circumferentially provided with a plurality of air inflow/outflow ports 41 for taking in air necessary for combustion of the heat source 10 to promote combustion and exhibits a function as a wall portion that keeps heat in the bottom surface portion 32 by minimizing heat released to the outside.

Figure 3:
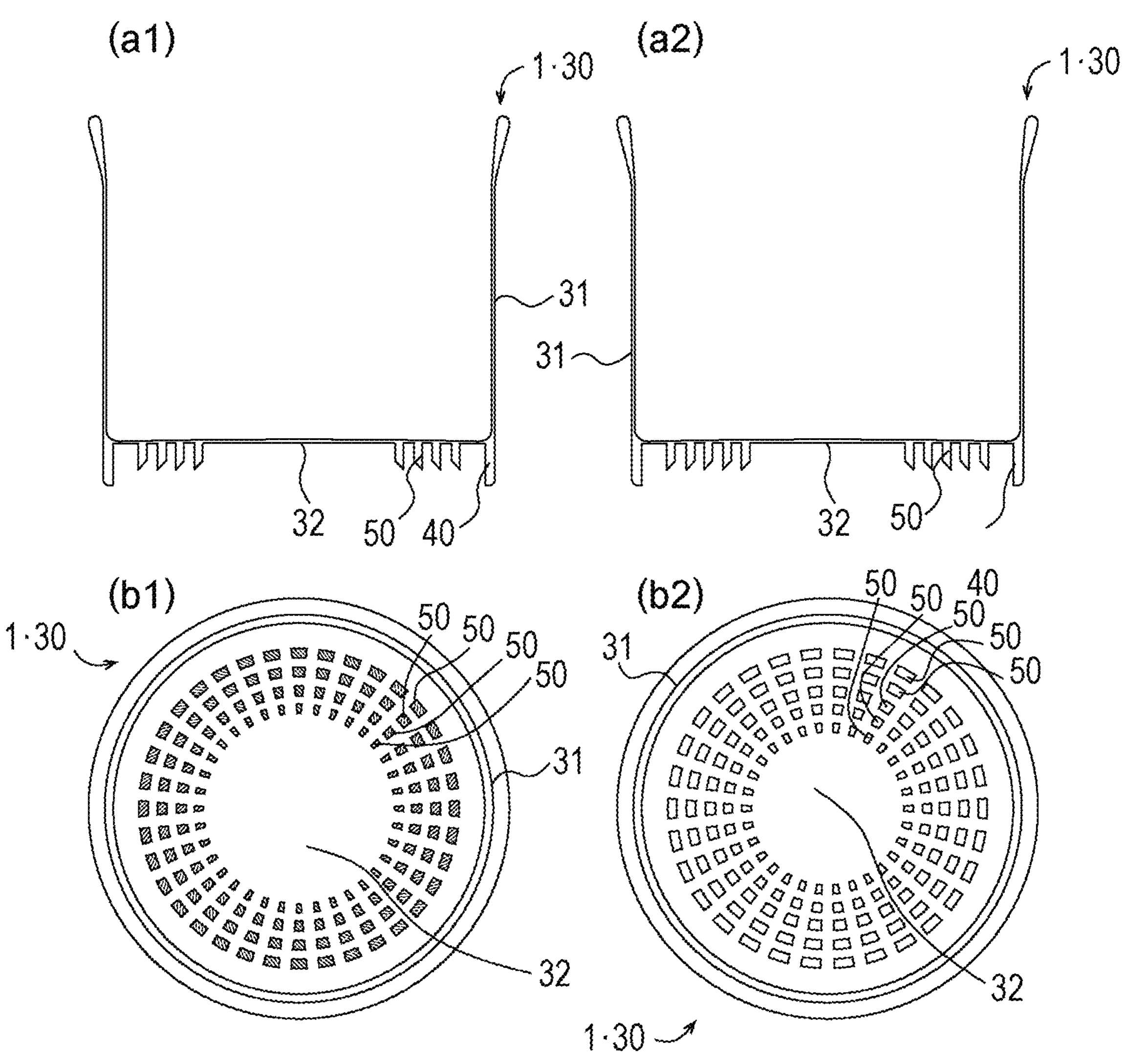
FIGS. 3(*a*1), 3(*a*2), 3(*b*1), and 3(*b*2) are arrangement configuration illustrative diagrams illustrating an arrangement configuration of heat transfer protrusions according to the present invention.

FIGS. 3(*a*1), 3(*a*2), 3(*b*1), and 3(*b*2) are arrangement configuration illustrative diagrams illustrating an arrangement configuration of the heat transfer protrusions 50 according to the present invention. FIG. 3(*al*) is a cross-sectional view in a case where the number of the heat transfer protrusions 50 linearly arranged from the center of the bottom surface portion 32 toward the air inflow/outflow adjustment portion 40 is four. FIG. 3(*b*1) is a bottom view in a case where the number of the heat transfer protrusions 50 linearly arranged from the center of the bottom surface portion 32 toward the air inflow/outflow adjustment portion 40 is four. FIG. 3(*a*2) is a cross-sectional view in a case where the number of the heat transfer protrusions 50 linearly arranged from the center of the bottom surface portion 32 toward the air inflow/outflow adjustment portion 40 is five, FIG. 3(*b*2) is a configuration example illustrating a bottom view in a case where the number of the heat transfer protrusion 50 linearly arranged from the center of the bottom surface portion 32 toward the air inflow/outflow adjustment portion 40 is five. However, FIGS. 3(*a*1), 3(*a*2), 3(*b*1), and 3(*b*2) merely illustrate a configuration example of the arrangement, and the number of the heat transfer protrusions 50 per row is not limited.

FIGS. 4(*a*) to 4(*c*) are example illustrative diagrams describing an example in which a plurality of rows in which the heat transfer protrusions 50 according to the present invention are arranged so as to draw an arc from the center toward the outside of the bottom surface portion 32 at a predetermined interval is provided in the circumferential direction, FIG. 4(*a*) illustrates an example in which the number of the heat transfer protrusions 50 arranged in the row is three, FIG. 4(*b*) illustrates an example in which the number of the heat transfer protrusions 50 arranged in the row is five, and FIG. 4(*c*) illustrates an example in which a heat transfer protrusion 50 is further provided at the center of the bottom surface portion 32 in the configuration of FIG. 4(*b*). As illustrated in FIGS. 4(*a*) to 4(*c*), in the case of the arc-shaped arrangement, a distance from the center of the bottom surface portion 32 to the side wall portion 31 is long, and a moving distance in which heat flows, that is, a distance capable of receiving the amount of heat from the heat source 10 is long accordingly. In the case of the arcuate arrangement, the heat transfer protrusions 50 located on a front periphery are disposed at positions that do not form a barrier against the heat transfer protrusions 50 located on the next outside, so that an excellent effect that heat can be more efficiently transferred to the object to be cooked 20 can be exhibited as compared with the arrangement in which the heat transfer protrusions 50 are linearly disposed toward the outside of the bottom surface portion 32. It is also preferable that the heat transfer protrusion 50 in the central portion illustrated in FIG. 4(*c*) is provided to prevent flame from being incompletely burned due to direct contact of a burner portion with the bottom surface portion 32 in a case where the heat source 10 is a gas stove.

Figure 5:
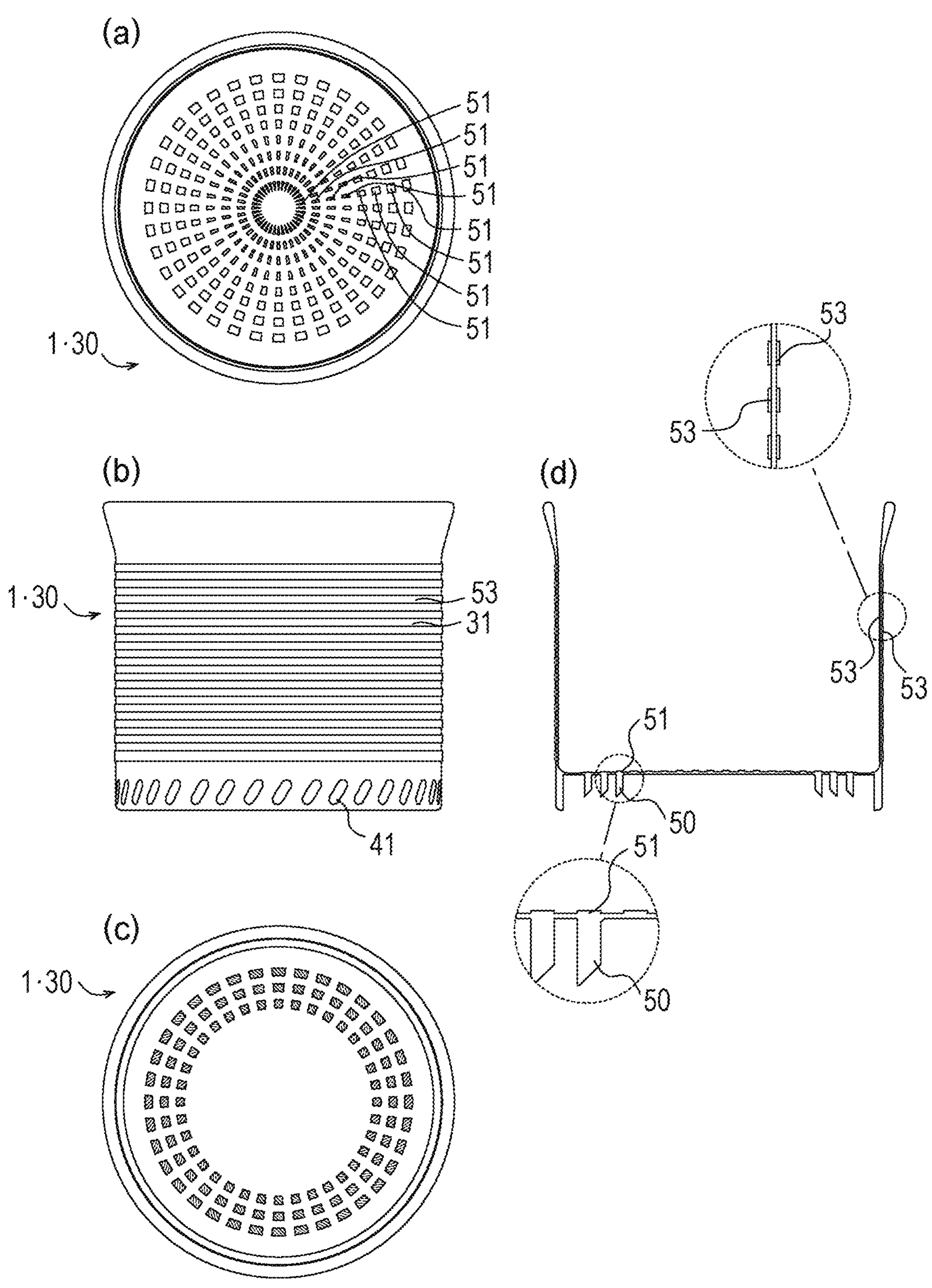
FIGS. 5(*a*) to 5(*d*) are configuration illustrative diagrams illustrating a configuration of a heat transfer step and a heat transfer side surface horizontal step according to the present invention.

FIGS. 5(*a*) to 5(*d*) are configuration illustrative diagrams illustrating the configuration of heat transfer steps 51 and heat transfer side surface horizontal steps 53 according to the present invention. FIG. 5(*a*) is a plan view, FIG. 5(*b*) is a front view, FIG. 5(*c*) is a bottom view, and FIG. 5(*d*) is a cross-sectional view, a partially enlarged view of the heat transfer steps 51, and a partially enlarged view of the heat transfer side surface horizontal steps 53.

The heat transfer steps 51 are steps provided on the bottom surface portion 32 located inside the container, and are provided with, for example, steps protruding from the bottom surface portion 32 inside the container, which are opposite to the heat transfer protrusions 50 disposed outside the bottom surface portion 32, toward the opening side of the container. Since the step only needs to have a shape for increasing the surface area, the height of the heat transfer protrusion 50 is not necessary and may be small. This is because if the step is made too large, cleaning or the like after cooking becomes difficult.

The heat transfer side surface horizontal step 53 includes a plurality of grooves in the horizontal direction in the side wall portion 31 of the container 30, and serves to transfer heat from the lower side upward. In the drawings, the heat transfer side surface horizontal steps 53 are formed on both the outer peripheral surface and the inner peripheral surface of the side wall portion 31, but only the outer peripheral surface or only the inner peripheral surface may be formed. With the formation of such grooves, a heat transfer effect can be enhanced, and a design effect excellent in aesthetic appearance can be obtained.

Figure 6:
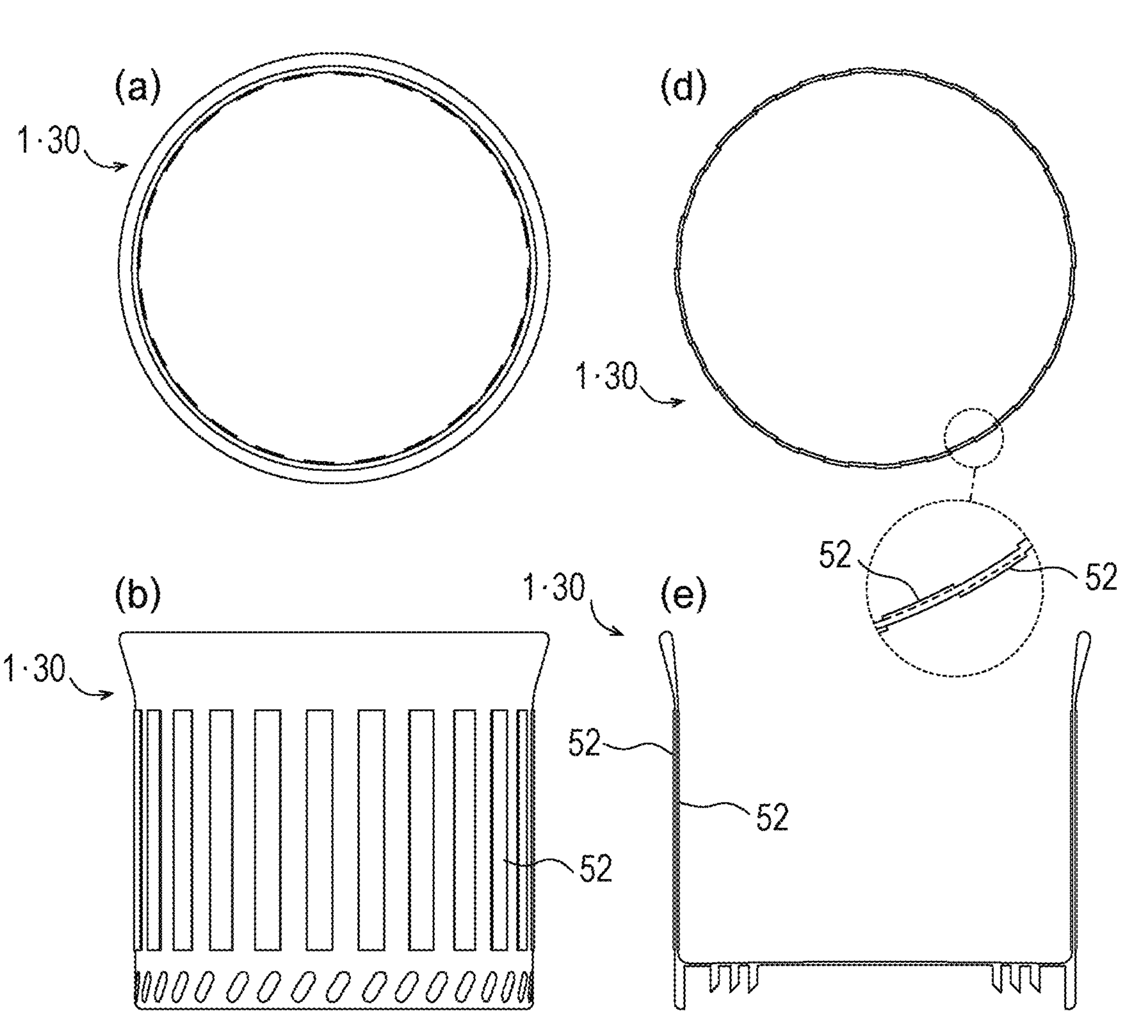
FIGS. 6(*a*) to 6(*e*) are configuration illustrative diagrams illustrating a configuration of a heat transfer side surface vertical step according to the present invention.
Figure 6:
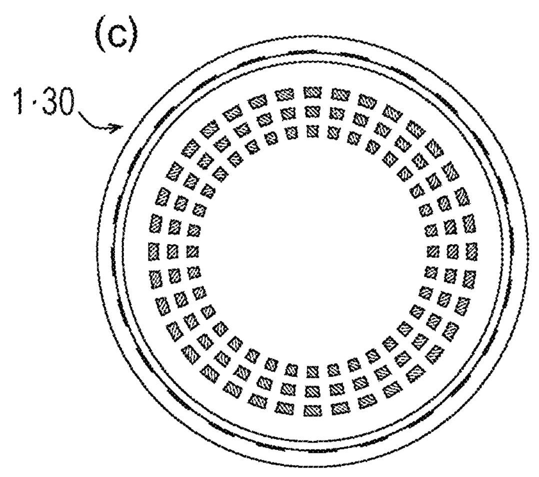

FIGS. 6(*a*) to 6(*e*) are configuration illustrative diagrams illustrating a configuration of the heat transfer side surface vertical steps 52 according to the present invention. FIG. 6(*a*) is a plan view, FIG. 6(*b*) is a front view, FIG. 6(*c*) is a bottom view, FIG. 6(*d*) is a transverse cross-sectional view and a partially enlarged view of the heat transfer side surface vertical steps 52, and FIG. 6(*e*) is a longitudinal cross-sectional view.

The heat transfer side surface vertical step 52 includes a plurality of steps in the vertical direction in the side wall portion 31 of the container 30, and in the drawing, the heat transfer side surface vertical steps 52 are formed on both the outer peripheral surface and the inner peripheral surface of the side wall portion 31, but may be formed only on the outer peripheral surface or only on the inner peripheral surface. The formation of such steps makes it possible to obtain a design effect excellent in aesthetic appearance.

Aluminum A is a material suitable for the cooking device 1 with enhanced thermal conductivity according to the present invention. The specific gravity of aluminum A is 2.7, which is about ⅓ of that of iron 7.8 or copper 8.9. Therefore, since aluminum A is much lighter and has a higher specific strength (strength per unit weight) in the same volume, aluminum A is a material capable of providing a light and sturdy cooking device. In addition, aluminum A forms a dense and stable oxide film in the air, and this film has corrosion resistance that naturally prevents corrosion, is harmless and odorless, is hygienic, and has no toxicity. Even if a metal is eluted by some chemical action or a compound is formed, it does not damage a human body or damage soil like a heavy metal. It should be noted that aluminum has a characteristic of easily transmitting heat. Aluminum A has a thermal conductivity about three times that of iron, and has a specific heat about two times that of iron, stainless steel, titanium, or the like. Therefore, aluminum A has a characteristic that once heated, aluminum A is hardly cooled, and aluminum A can be said to be a material suitable for cooking device 1 having enhanced thermal conductivity according to the present invention by taking advantage of these characteristics.

The alloy G is not so high in tensile strength when pure aluminum is used as a material, and thus is an aluminum alloy material in which any one of magnesium, manganese, copper, silicon, zinc, and the like or a combination thereof is added thereto, or the strength is increased by heat treatment.

As described above, it is preferable to use an aluminum-based material, but other materials are not excluded as options depending on a cooking method and a type of a cooking device. For example, when "rice cooking" is taken as an example of the cooking method, properties to be obtained are a high heat transfer rate (not burnt) and a high specific heat (not cooled), and aluminum is excellent. Considering only the thermal conductivity, copper is 1.7 times more excellent, but since the specific heat is small (easily cooled), it cannot be said that copper is very suitable for steaming after stopping the fire. That is, aluminum A is suitable for cooking rice that is easily burnt and needs steaming. However, copper is more suitable simply for boiling water.

Next, taking a "mug" as an example of the type of the cooking device, properties to be obtained are a low heat transfer coefficient (mouth is not hot), a large specific heat (is not easily cooled), and the like, and titanium is suitable.

Since titanium has a large specific heat and is less likely to cool than aluminum A, titanium is suitable for putting a warm material. On the other hand, aluminum A has a too high thermal conductivity, and thus may burn the lips. In such a case, titanium may be used for the side wall portion 31 including the mouth and the like and the handle, and aluminum A or alloy G may be used for the bottom surface portion 32 including the heat transfer protrusions 50. Therefore, it is desirable to appropriately select the material according to the type of cooking method, cooking device, and the like.

Figure 7:
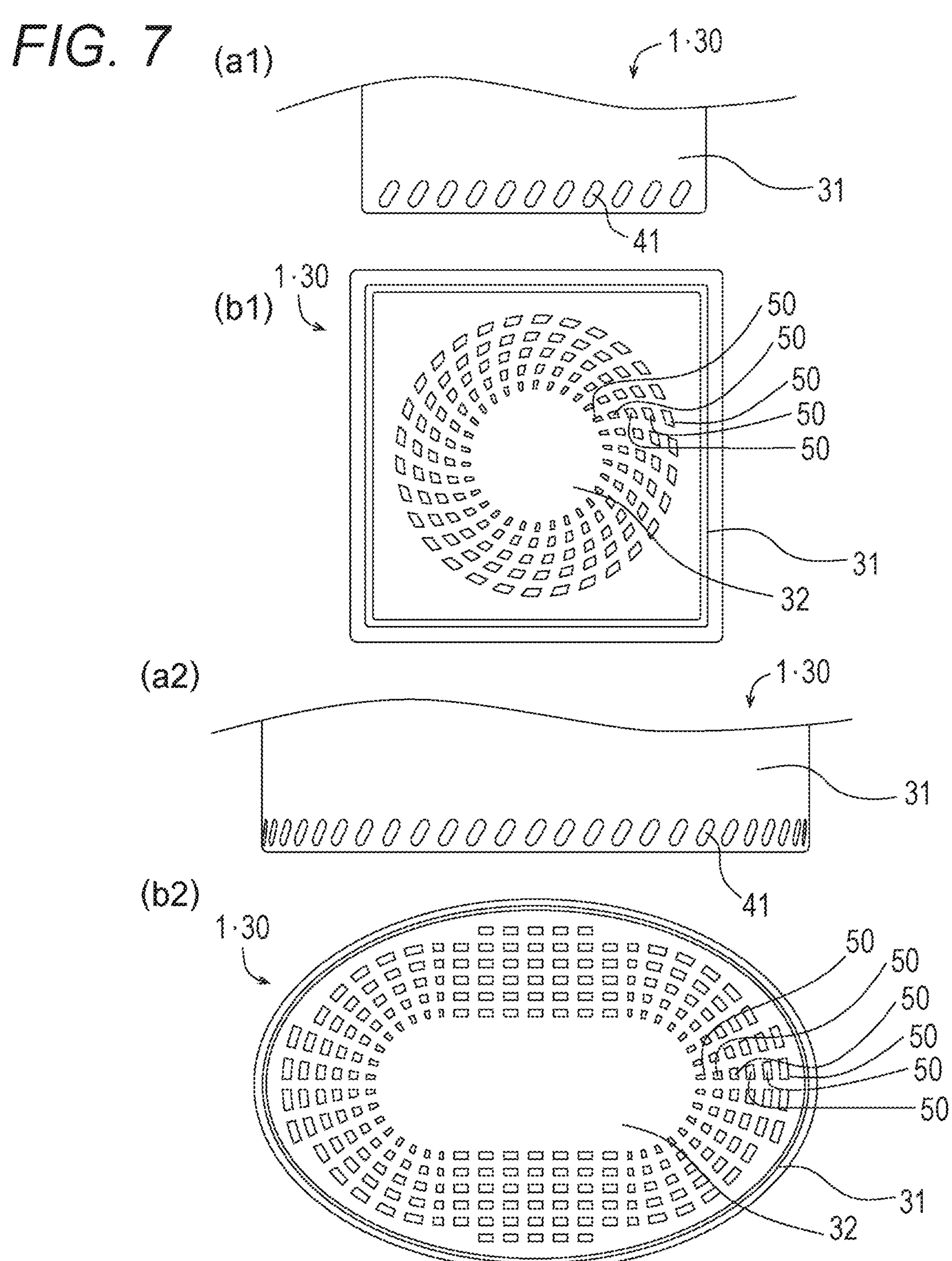
FIGS. 7(*a*1), 7(*b*1), 7(*a*2), and 7(*b*2) are illustrative diagrams of an example of an outer shape exemplifying an outer shape of a container according to the present invention.

FIGS. 7(*a*1), 7(*b*1), 7(*a*2), and 7(*b*2) are external shape example illustrative diagrams exemplifying the external shape of the container 30 according to the present invention, FIG. 7(*al*) shows a front view in the case of forming a substantially square external shape in a bottom view, and FIG. 7(*b*1) shows a bottom view thereof. FIG. 7(*a*2) shows a front view in a case where a substantially elliptical outer shape is configured in a bottom view, and FIG. 7(*b*2) shows a bottom view thereof. The outer shape of the container 30 shown in FIGS. 1(*a*) to 1(*d*) through FIGS. 6(*a*) to 6(*e*), is shown in a substantially circular shape in a plan view or a bottom view, but may be a rectangular shape such as a square shape as shown in FIGS. 7(*a*1) to 7(*b*2), an elliptical shape, or the like. In this case, the arrangement configuration of the heat transfer protrusions 50 is also appropriately arranged according to the outer shape of the container 30 instead of being protrusions provided outside the bottom surface portion 32 in order to enhance heat transfer efficiency of the bottom surface portion 32 that transfers heat from the heat source 10 to the object to be cooked 20.

INDUSTRIAL APPLICABILITY

According to the cooking device with enhanced thermal conductivity according to the present invention, it is possible to efficiently transfer the amount of heat obtained from the heat source to the object to be cooked, and thus it is possible to use the cooking device while minimizing the amount of fuel, and it is considered that the cooking device has high industrial applicability since it exhibits various effects that a burden on baggage is reduced when camping, fishing, touring, or the like in the outdoors is enjoyed and cooking can be performed in a short time.

LIST OF REFERENCE SIGNS

1 Cooking device with enhanced thermal conductivity
10 Heat source
20 Object to be cooked
30 Container
31 Side wall portion
32 Bottom surface portion
40 Air inflow/outflow adjustment portion
41 Air inflow/outflow port
50 Heat transfer protrusion
51 Heat transfer step
52 Heat transfer side surface vertical step
53 Heat transfer side surface horizontal step
A Aluminum
G Alloy

The invention claimed is:

1. A cooking device (1) with enhanced thermal conductivity, the cooking device (1) being capable of efficiently transferring heat obtained from a heat source (10) to an object to be cooked (20) and comprising a substantially pot shaped container (30), wherein a side wall portion (31) of the container (30) has an air inflow/outflow adjustment portion (40) circumferentially provided with an air inflow/outflow port (41) protruding downward from a bottom surface portion (32), a plurality of heat transfer protrusions (50) vertically protruding outward from the bottom surface portion (32) are circumferentially provided at predetermined intervals to be annular in bottom view on the bottom surface portion (32) of the container (30), each of the plurality of heat transfer protrusions (50) being formed with a one-side inclined surface extending from inside to outside so that a distal end shape of the heat transfer protrusion (50) is substantially a wedge shape, a relationship between the heat transfer protrusion (50) circumferentially provided outside and the heat transfer protrusion (50) circumferentially provided inside gradually increases in a surface area from the inside to the outside, and a plurality of rows of the heat transfer protrusions (50) linearly aligned from a center of the bottom surface portion (32) toward the air inflow/outflow adjustment portion (40) in a radial direction are provided at equal angular intervals, with which a flow of heat from the heat source (10) is linearly formed in the radial direction.

2. The cooking device (1) with enhanced thermal conductivity according to claim 1, further comprising a heat transfer step (51) including a plurality of steps protruding toward an inside of the bottom surface portion (32) of the container (30).

3. The cooking device (1) with enhanced thermal conductivity according to claim 1, wherein the side wall portion (31) of the container (30) includes a heat transfer side surface vertical step (52) including a plurality of steps in a vertical direction.

4. The cooking device (1) with enhanced thermal conductivity according to claim 1, wherein the side wall portion (31) of the container (30) includes a heat transfer side surface horizontal step (53) including a plurality of steps in a horizontal direction.

5. The cooking device (1) with enhanced thermal conductivity according to claim 1, wherein a material is aluminum (A) or an alloy (G) obtained by adding any one or a combination of magnesium, manganese, copper, silicon, and zinc to aluminum.

6. The cooking device (1) with enhanced thermal conductivity according to claim 1, wherein each of the plurality of heat transfer protrusions (50) is formed such that the distal end shape of the heat transfer protrusion (50) has the one-side inclined surface on a surface toward the center of the bottom surface portion (32).

7. The cooking device (1) with enhanced thermal conductivity according to claim 1, wherein a circumferential width of the heat transfer protrusion (50) circumferentially provided outside is wider than a circumferential width of the heat transfer protrusion (50) circumferentially provided inside.

8. A cooking device (1) with enhanced thermal conductivity, the cooking device (1) being capable of efficiently transferring heat obtained from a heat source (10) to an object to be cooked (20) and comprising a substantially pot shaped container (30), wherein a side wall portion (31) of the container (30) has an air inflow/outflow adjustment portion (40) circumferentially provided with an air inflow/outflow port (41)

protruding downward from a bottom surface portion (32), a plurality of heat transfer protrusions (50) vertically protruding outward from the bottom surface portion (32) are circumferentially provided at predetermined intervals to be annular in bottom view on the bottom surface portion (32) of the container (30), each of the plurality of heat transfer protrusions (50) being formed with a one-side inclined surface extending from inside to outside so that a distal end shape of the heat transfer protrusion (50) is substantially a wedge shape, a relationship between the heat transfer protrusion (50) circumferentially provided outside and the heat transfer protrusion (50) circumferentially provided inside gradually increases in a surface area from the inside to the outside, and a plurality of rows of the heat transfer protrusions (50) arranged so as to draw an arc from a center of the bottom surface portion (32) toward the air inflow/outflow adjustment portion (40) in a radial direction are provided at equal angular intervals, with which a flow of heat from the heat source (10) is formed to draw the arc in the radial direction.

9. The cooking device (1) with enhanced thermal conductivity according to claim 8, further comprising a heat transfer step (51) including a plurality of steps protruding toward an inside of the bottom surface portion (32) of the container (30).

10. The cooking device (1) with enhanced thermal conductivity according to claim 8, wherein the side wall portion (31) of the container (30) includes a heat transfer side surface vertical step (52) including a plurality of steps in a vertical direction.

11. The cooking device (1) with enhanced thermal conductivity according to claim 8, wherein the side wall portion (31) of the container (30) includes a heat transfer side surface horizontal step (53) including a plurality of steps in a horizontal direction.

12. The cooking device (1) with enhanced thermal conductivity according to claim 8, wherein a material is aluminum (A) or an alloy (G) obtained by adding any one or a combination of magnesium, manganese, copper, silicon, and zinc to aluminum.

13. The cooking device (1) with enhanced thermal conductivity according to claim 8, wherein each of the plurality of heat transfer protrusions (50) is formed such that the distal end shape of the heat transfer protrusion (50) has the one-side inclined surface on a surface toward the center of the bottom surface portion (32).

14. The cooking device (1) with enhanced thermal conductivity according to claim 8, wherein a circumferential width of the heat transfer protrusion (50) circumferentially provided outside is wider than a circumferential width of the heat transfer protrusion (50) circumferentially provided inside.

* * * * *